3,745,017
ANIMAL FEED PROCESS
Keith E. Queal, 1243 2d Ave. S., Clinton, Iowa 52732
No Drawing. Continuation-in-part of application Ser. No. 592,974, Nov. 9, 1966, now abandoned. This application May 11, 1971, Ser. No. 142,394
Int. Cl. A23k 1/02
U.S. Cl. 99—6                9 Claims

ABSTRACT OF THE DISCLOSURE

The disclosure is directed to a process for producing a dried, sweetened, free-flowing animal feed. The process includes the steps of directly steaming an animal feed carrier, contacting the steamed carrier with a sweetening agent and drying the steamed feed.

---

This application is a continuation in part of patent application Ser. No. 592,974 filed Nov. 9, 1966, now abandoned.

This invention relates to an improved process for producing animal feed. In particular the invention relates to a process for producing a dried, sweetened, free-flowing animal feed.

Dried sweetened animal feed has generally been produced in the past by simply mixing with heating a sweetening agent such as cane and/or corn sugar molasses with a carrier, such as ground corn cobs, ground beet pulp, chopped hay, corn germ meal, cane bagasse, wheat bran, corn gluten feed and the like, and drying the mixture. Although this method has proven somewhat satisfactory when the level of the sweetening agent is kept at a relatively low level, when greater amounts thereof are used the mixture becomes increasingly more difficult to handle during drying since it has the tendency to ball or agglomerate in the drier and to stick to the inner surfaces of the drier thus causing the adhering material to burn or caramelize. Further, at high sweetening levels and after drying, the particles of the carrier will have relatively large amounts of the sweetening agent on the surfaces thereof, and, because of the hygroscopic nature of the sweetening agent, upon storage of the feed moisture tends to be absorbed thus causing caking of the feed.

U.S. Pat. Re. 25,337 reissued Feb. 26, 1963, discloses a process for producing a sweetened animal feed wherein soybean hulls are mixed with a sweetening agent at elevated temperatures thereby causing the sweetening agent to be absorbed into the soybean hulls. The absorption of the sweetening agent allegedly overcomes the problems associated with sweetened feed having a surface coating of sweetening agent thereon. According to this patent, soybean hulls were found superior with respect to absorbing a sweetening agent than other carriers, the superiority being manifested by the physical properties of the finished dried feed product. In this process, the soybean hulls are first wetted or dampened with water and then the sweetening agent is mixed therewith. This increases the degree of absorption of the sweetening agent. Although the teachings of this patent apparently produce an improved sweetened animal feed when the carrier is soybean hulls, there is an obvious commercial need to produce improved sweetened animal feeds containing carriers other than just soybean hulls. Furthermore, because of the additional moisture initially added to the carrier more energy must be supplied to the drier per unit weight of the sweetened feed in order to evaporate this moisture.

It is an object of the present invention to provide a method of producing dried, sweetened, free-flowing animal feed.

Another object of the present invention is to provide a method of producing a dried, sweetened, free-flowing animal feed where the carrier therefor may be selected from a variety of substances.

A more specific object of the present invention is to provide a method of producing a dried, sweetened, free-flowing animal feed without an overt addition of water thereto.

The above enumerated objects, as well as other objects, together with the advantages of the present invention, will readily be comprehended by persons skilled in the art upon reference to the following description and examples.

Accordingly, the present invention includes a method of producing a dried, free-flowing animal feed containing a sweetening agent whcih comprises steaming an animal feed carrier, forming a hot mixture of the animal feed carrier and a sweetening agent thereby effecting absorption into said carrier of substantial quantities of the sweetening agent.

The term "animal feed carrier" is herein defined as a vegetable material which has a cellular structure. Exemplary of such carriers are soybean hulls, corn cobs, beet pulp, chopped hay, peanut stem meal, corn germ meal, cane bagasse, wheat bran, tea residue, and the like.

Although the exact mechanism by which the steam acts upon the animal feed carrier to cause the sweetening agent to be absorbed into the carrier is not fully understood, it is believed that the steam ruptures or opens the capillary tubes and/or the cells of the carrier to such an extent as to permit substantial absorption of the sweetening agent into the carrier. Microscopic examination of cross sections of dried sweetened animal feed made by the method of the present invention shows a honeycombed interior substantially completely penetrated by the sweetening agent and only a small number of sugar crystals on the exterior surfaces of the carrier.

The sweetening agent used in the method of the present invention may be any of the sweetening agents commonly used to sweeten animal feeds such as cane, beet, citrus, wood, or corn sugar molasses or mixtures thereof, or the sweetening agent may be any substance which contains relatively large amounts of a sugar.

The levels of the sweetening agents employed in the present method may vary over a relatively wide range and are of course dependent to a certain extent upon the level desired in the feed. It is preferred in the present invention that the level of sweetening agent be such so as to achieve in the animal feed a sugar content of between about 40 and 50 percent by weight. The term sugar as herein used is any water soluble mono-, di-, tri-, or higher saccharides such as glucose, fructose, mannose, galactose, rhamnose, xylose, arabinose, fucose, maltose, isomaltose, gentiobiose, sucrose, malibiose, lactose, laminaribiose, nigerose, trenalose, maltotriose, maltotetraose, maltopentaose, stachyose, raffinose, melezitose and the like.

The method of the present invention may be carried out in a variety of ways; for instance, the carrier may first be treated with steam and then mixed or blended with the sweetening agent or the carrier may be treated with steam while the sweetening agent is being added thereto, or the carrier and the sweetener may first be blended together and then the complete mixture steamed. The latter two methods are preferred since the products produced thereby appear to absorb less moisture and may be dried in a shorter period of time.

To realize the objects of the present invention, it is critical that the mixture of animal feed carrier and sweetening agent is maintained in a "hot" state for a period sufficient to effect absorption of the sweetening agent into the carrier. Typical temperatures for this purpose are in the range of from about 150° to about 225° F.

Of course, for the sweetening agent to be absorbed into the carrier there must be some water present. The requisite amount of water which must be present is preferably supplied solely by a liquid sweetening agent, such as cane or corn sugar molasses, but it is contemplated as coming within the scope of the present invention that dry sweetening agents may be used such as sucrose, or dried corn syrup solids; for instance, by mixing them with water and adding this to the carrier and then steaming, or mixing a dry sweetening agent directly with the carrier, adding water and then steaming.

In the preferred method of the present invention, the mixture containing the carrier and liquid sweetening agent is steamed at a temperature from about 150° to about 225° F. and maintained in this temperature range with mixing for a short time until substantially all the sweetening agent is absorbed into the carrier. In the case where the carrier is corn germ meal, it is preferred that the temperature to effect absorption of the sweetening agent be from about 200° to about 225° F. The temperature of the mixture may be achieved by first heating the sweetening agent, for instance, to a temperature between about 100° and about 225° F., adding the hot sweetening agent to the carrier and then steaming the mixture while mixing the same. Additionally, following the steaming, further mixing in an open system may be employed, if desired, to cause some of the moisture contained in the mixture to evaporate or flash off. Also, the hot mixture may be aerated to reduce the moisture content of the mixture. When these procedures are used the amount of moisture which must be driven off in the drier is reduced.

It is a further aspect to the present invention to produce a dried, sweetened, free-flowing animal feed containing from about 40 to about 50 percent by weight of sugar. To achieve such high levels of sugar it is desirable that a liquid sweetening agent such as corn or cane sugar molasses or mixtures thereof containing above about 60 percent total sugars on a dry weight basis be used. These liquid sweetening agents may first be heated to a temperature in the range between about 100° and 225° F., and then mixed with the carrier, for instance, corn germ meal, and the mixture steamed to effect substantially complete absorption of the liquid sweetening agent into the carrier. The moist, hot, sweetened feed can then be dried by conventional means.

The process of the present invention may be carried out, for instance, in a conventional mixer which has been equipped with inlets for steam addition.

In order to more clearly describe the nature of the present invention, specific examples will hereafter be described. It should be understood, however, that this is done solely by way of example and is intended neither to delineate the scope of the invention nor limit the ambit of the appended claims. In the examples and throughout the specification, percentages are intended to refer to percent by weight unless otherwise specified.

EXAMPLE I

Forty pounds of cane sugar molasses (72 percent D.S.) at 170° F., was added to 16.7 pounds of corn germ meal. The mixture was blended for 3 minutes, steamed with 15 p.s.i.g. dry steam for 3 minutes while blending to achieve a mix temperature of between 180° and 225° F., and blended an additional 10 minutes and then dried in a Proctor-Schwartz Tray Dryer at 250° F. for 30 minutes. The resulting product contained 45.8 percent total sugar calculated as invert sugar, was of granular texture, free flowing with greatly reduced tendency to cake or lump on storage in air of normal humidity and was suitable for dry mixing with other feed ingredients.

EXAMPLE II

Forty pounds of cane sugar molasses (72 percent D.S.) at 170° F. was added to 16.7 pounds of corn germ meal, which had been previously steamed with dry steam for 5 minutes to a temperature between 180° and 225° F. The mixture was then blended for 10 minutes and dried in a Proctor-Schwartz Tray Dryer at 250° F. for 30 minutes. The dried product contained 44.3 percent total sugar calculated as invert sugar, was of granular texture, free-flowing with greatly reduced tendency to cake or lump on storage in air of normal humidity and was suitable for dry mixing with other feed ingredients.

EXAMPLE III

A concentrated blend (63.8 percent D.S.) was prepared containing 52 percent cane sugar molasses and 48 percent corn sugar molasses on a dry substance basis. The blend was then diluted with water to achieve 55 percent dry substance. Forty-four and six-tenths pounds of the diluted blend was heated to 170° F. and then added to 16.7 pounds of corn germ meal. The mixture was blended for 3 minutes, steamed for 3 minutes with dry steam while blending to a temperature between 180° and 225° F., blended 10 minutes longer and then aerated 10 minutes. The wet product was dried in a Proctor-Schwartz Tray Dryer at 250° F. for 30 minutes. The dried product contained 44.6 percent total sugar calculated as invert sugar, was granular in texture, free flowing with greatly reduced tendency to cake or lump on storage in air of normal humidity and was suitable for drying mixing with other feed ingredients.

EXAMPLE IV

Fifty-two and one-tenth pounds of cane sugar molasses (72 percent D.S.) at 170° F. was added to 16.6 pounds of corn germ meal. The mixture was blended 3 minutes, steamed 3 minutes with dry steam to a temperature between 180° and 225° F., blended an additional 10 minutes and then aerated 10 minutes. The wet product was dried in a Proctor-Schwartz Tray Dryer at 250° F. for 30 minutes. The product obtained contained 51.3 percent total sugars calculated as invert sugar, was granular in texture, free flowing with greatly reduced tendency to cake or lump on storage in air of normal humidity and was suitable for dry mixing with other feed ingredients.

EXAMPLE V

Fifty-two and eight-tenths pounds of hydrol (corn sugar molasses) at approximately 55 percent dry substance was heated to 170° F. and added to 16.6 pounds of corn germ meal. The mixture was blended 3 minutes, steamed 3 minutes with dry steam to a temperature between 180° and 225° F., blended an additional 10 minutes, and then aerated 10 minutes. The wet product was dried in a Proctor-Schwartz Tray Dryer at 250° F. for 30 minutes. The resulting product contained 47.4 percent total sugar calculated as invert sugar, was granular in texture, free flowing with greatly reduced tendency to cake or lump on storage in air of normal humidity and was suitable for dry mixing with other feed ingredients.

EXAMPLE VI

Forty pounds of cane sugar molasses (72 percent D.S.) was heated to 100° F. and added to 16.4 pounds of corn germ meal. The mixture was blended 3 minutes, steamed 3 minutes with dry steam to a temperature between 180° and 225° F., blended an additional 10 minutes and aerated 10 minutes. The wet product was then dried in a Proctor-Schwartz Tray Dryer at 250° F. for 30 minutes. The resultant product contained 44.2 percent total sugar calculated as invert sugar, was granular in texture, free flowing with greatly reduced tendency to cake or lump on storage in air of normal humidity and was suitable for dry mixing with other feed ingredients.

EXAMPLE VII

Thirty-five pounds of cane sugar molasses (72 percent D.S.) was heated to 100° F. and added to 18.5 pounds of corn germ meal. The mixture was blended 10 minutes.

The wet feed mixture was extremely sticky due to unabsorbed molasses remaining on the surface of the corn germ meal carrier. The mixture caked badly during drying and the total sugar content determined as invert sugar was reduced from 42 percent (the calculated level before drying) to 35 percent after drying. The drying of the mixture was carried out in a Proctor-Schwartz Tray Dryer at 250° F. for 45 minutes.

EXAMPLE VIII

To a continuous mixer, 89.25 pounds of corn sugar molasses (58.06 percent D.S.) at 142° F. and 46 pounds of corn germ meal (91.8 percent D.S.) were added per minute. Dry steam at 15 p.s.i.g. was sparged into the mixer continuously at a rate sufficient to effect the absorption of the sweetener by the feed carrier as the mixing operation continued. The temperature of the mixture during steaming was approximately 154° F. The wet feed mixture, before steaming, was calculated to contain 30.5 percent moisture and 31.6 percent total sugar calculated as invert sugar. The wet feed mixture, after steaming, contained 29.9 percent moisture and 33.6 percent total sugar calculated as invert sugar. After drying in a Heil Continuous Dryer at 240° F. and an output rate of 105 pounds per minute, the resulting product contained 45.6 percent total sugar calculated as invert sugar and a moisture content of 1.2 percent. The dried product was of granular texture, free flowing with greatly reduced tendency to cake or lump on storage in air of normal humidity and was suitable for mixing with other feed ingredients.

EXAMPLE IX

To a continuous mixer, 115.5 pounds of corn sugar molasses (58.06 percent D.S.) at 146° F. and 46 pounds of corn germ meal (91.8 percent D.S.) were added per minute. Dry steam at 15 p.s.i.g. was sparged into the mixer continuously to effect this complete absorption of the sweetener by the feed carrier as the mixing operation continued. The temperature of the mixture during steaming was approximately 159° F. The wet feed mixture, before steaming, was calculated to contain 32.4 percent moisture and 34.4 percent total sugar as invert sugar. The wet feed mixture, after steaming, contained 31.7 percent total sugar calculated as invert sugar. After drying in a Heil Continuous Dryer at 240° F. and an output of 110 pounds per minute, the resulting product contained 49.4 percent total sugar calculated as invert sugar and a moisture content of 1.4 percent. The dried product was free flowing, granular in texture showing greatly reduced tendency to cake or lump on storage in air of normal humidity and was suitable for mixing with other feed ingredients.

EXAMPLE X

To a continuous mixer, 119.25 pounds of corn sugar molasses (63 percent D.S.) at 114° F. and 46 pounds of corn germ meal (88.7 percent D.S.) were added per minute. Dry steam at 15 p.s.i.g. was sparged into the mixer continuously to effect the complete absorption of the sweetener by the feed carrier, as the mixing continued. The temperature of the mixture during steaming was approximately 180° F. The wet feed mixture, before steaming, was calculated to contain 29.4 percent moisture and 31.6 percent total sugar calculated as invert sugar. The wet feed mixture, after steaming, was found to contain 28.9 percent moisture and 33.0 percent total sugar calculated as invert sugar. After drying in a Heil Continuous Dryer at 240° F. and an output rate of 152 pounds per minute, the resulting product contained 1.5 percent moisture and 43.6 percent total sugar calculated as invert sugar. The dried product was of granular texture, free flowing with greatly reduced tendency to cake or lump on storage in air of normal humidity and was suitable for mixing with other feed ingredients.

EXAMPLE XI

To a continuous mixer, 64.8 pounds of corn sugar molasses (69.7 percent D.S.) at 139° F. and 36 pounds of corn germ meal (91.4 percent D.S.) were added per minute. Dry steam at 15 p.s.i.g. was sparged into the mixer continuously to effect complete absorption of the sweetener by the feed carrier as the mixing continued. The temperature of the mixture during steaming was approximately 165° F. The wet mixture, before steaming, was calculated to contain 22.6 percent moisture and 34.2 percent total sugar calculated as invert sugar. After steaming, the wet feed mixture was found to contain 24.0 percent moisture and 35.2 percent total sugar calculated as invert sugar. After drying in a Heil Continuous Dryer at 240° F. and at an output rate of 91 pounds per minute, the resulting product contained 2.9 percent moisture and 47.8 percent total sugar calculated as invert sugar. The dried product was of granular texture, free flowing with greatly reduced tendency to cake or lump on storage in air of normal humidity and was suitable for mixing with other feed ingredients.

EXAMPLE XII

Forty and six-tenths pounds of cane sugar molasses (72 percent D.S.) at 140° F. were added to 16 pounds of corn cobs containing 6.5 percent moisture and the mixture ground to pass through a ⅛" screen. The mixture was blended for 3 minutes, steamed for 3 minutes with dry steam to a temperature between 180° and 225° F. while blending, and then blended an additional 3 minutes before drying. The mixture was dried in a Proctor-Schwartz Tray Dryer at 250° F. for 30 minutes. The resulting product contained 44.4 percent total sugar calculated as invert sugar, was of granular texture, free flowing with greatly reduced tendency to cake or lump on storage in air of normal humidity and was suitable for mixing with other feed ingredients.

EXAMPLE XIII

Forty and six-tenths pounds of cane sugar molasses (72 percent D.S.) at 140° F. were added to 16 pounds of corn cobs containing 6.5 percent moisture and ground to pass through a ⅛" screen. The mixture was blended for 9 minutes before drying in a Proctor-Schwartz Tray Dryer at 250° F. for 60 minutes. The resulting product assayed 45.5 percent total sugar calculated as invert sugar, but was caked and lumpy and had a glazed surface after drying indicating the presence of unabsorbed sweetening agent. The product was not free flowing or suitable for blending with other feed ingredients.

EXAMPLE XIV

Forty pounds of cane sugar molasses (72 percent D.S.) at 140° F. were added to 16.3 pounds of beet pulp containing 8 percent moisture and ground to pass through a ⅛" screen. The mixture was blended 3 minutes, steamed 3 minutes with dry steam at a temperature between 180° and 225° F., while blending, and then blended an additional 3 minutes before drying in a Proctor-Schwartz Tray Dryer at 250° F. for 30 minutes. The resulting product assayed 46.2 percent total sugar calculated as invert sugar, was of granular texture, free flowing with greatly reduced tendency to cake or lump on storage in air of normal humidity and was suitable for mixing with other feed ingredients.

EXAMPLE XV

Forty and six-tenths pounds cane sugar molasses (72 percent D.S.) heated to 140° F. were added to 16.3 pounds of ground beet pulp containing 2.2 percent moisture. The mixture was blended for 9 minutes before drying in a Proctor-Schwartz Tray Dryer at 250° F. for 45 minutes. The resulting product assayed 43.0 percent total sugar calculated as invert sugar, but was caked and lumpy and exhibited unabsorbed sweetener on the surface of the feed particles.

EXAMPLE XVI

Forty and six-tenths pounds of cane sugar molasses (72 percent D.S.) heated to 140° F. were added to 16 pounds of hay containing 7.5 percent moisture and chopped to pass through a ⅜" screen. The mixture was blended 3 minutes, steamed 3 minutes with dry steam at a temperature between 180° and 222° F. while blending, and then blended an additional 3 minutes before drying in a Proctor-Schwartz Tray Dryer at 250° F. for 30 minutes. The resulting product assayed 45.5 percent total sugar calculated as invert sugar, was of a granular texture, free flowing with greatly reduced tendency to cake or lump on storage in air or normal humidity and was suitable for mixing with other feed ingredients.

EXAMPLE XVII

Forty and six-tenths pounds cane sugar molasses (72 percent D.S.) heated to 140° F. were blended with 16.2 pounds of hay containing 7.5 percent moisture and chopped to pass through a ⅜" screen. The mixture was blended 9 minutes before drying in a Proctor-Schwartz Tray Dryer at 250° F. for 45 minutes. The dried product assayed 42.9 percent total sugar calculated as invert sugar, but was caked and lumpy, and exhibited unabsorbed sweetening agent on the surface of the feed particles. The dried product was not suitable for blending with other feed ingredients.

EXAMPLE XVIII

Forty and six-tenths pounds cane sugar molasses (72 percent D.S.) heated to 140° F. were blended with 16.6 pounds of peanut stem meal containing 9.5 percent moisture and ground to pass through a ⅛" screen. The mixture was blended 3 minutes, steamed 3 minutes with dry steam to a temperature between 180° and 225° F. while blending, and then blended an additional 3 minutes before drying in a Proctor-Schwartz Tray Dryer at 250° for 30 minutes. The resulting dried product contained 46.9 percent total sugar calculated as invert sugar, was of granular texture, free flowing with greatly reduced tendency to cake or lump on storage in air of normal humidity and was suitable for blending with other feed ingredients.

EXAMPLE XIX

Forty and six-tenths pounds cane sugar molasses (72 percent D.S.) heated to 140° F. were blended with 16.4 pounds of cane bagasse containing 8.5 percent moisture and ground to pass through a ⅛" screen. The mixture was blended 3 minutes, steamed 3 minutes with dry steam to a temperature between 180° and 225° F. while blending, and then blended an additional 3 minutes before drying in a Proctor-Schwartz Tray Dryer at 250° F. for 30 minutes. The resulting dried product assayed 46.9 percent total sugar calculated as invert sugar, was of a granular texture, free flowing with greatly reduced tendency to cake or lump on storage in air of normal humidity and was suitable for blending with other feed ingredients.

EXAMPLE XX

Forty and six-tenths pounds cane sugar molasses (72 percent D.S.) at 140° F. were blended with 16.6 pounds of soybean millfeed containing 9.5 percent moisture. The soybean mixture was blended 3 minutes, steamed 3 minutes with dry steam to a temperature between 180° and 225° F., while blending, and then blended an additional 3 minutes before drying in a Proctor-Schwartz Tray Dryer at 250° F. for 30 minutes. The resulting dried product contained 45.6 percent total sugar calculated as invert sugar, was of a granular texture, free flowing, with greatly reduced tendency to cake or lump on storage in air of normal humidity and was suitable for blending with other feed ingredients.

EXAMPLE XXI

Forty and six-tenths pounds cane sugar molasses (72 percent D.S.) at 140° F. were blended with 16.1 pounds of wheat bran containing 7 percent moisture. The mixture was blended 3 minutes, steamed 3 minutes with dry steam to a temperature between 180° and 225° F., while blending, and then blended an additional 3 minutes before drying in a Proctor-Schwartz Tray Dryer at 250° for 30 minutes. The resulting dried product contained 45.4 percent total sugar calculated as invert sugar, was of a granular texture, free flowing, with greatly reduced tendency to cake or lump on storage in air of normal humidity and was suitable for blending with other feed ingredients.

EXAMPLE XXII

Forty and six-tenths pounds cane sugar molasses (72 percent D.S.) heated to 140° F. was blended with 15.6 pounds of tea residue containing 4.0 percent moisture. The mixture was blended 3 minutes, steamed 3 minutes with dry steam to a temperature between 180° and 225° F., while blending and then blended an additional 3 minutes before drying in a Proctor-Schwartz Tray Dryer at 250° F. for 30 minutes. The resulting dried product assayed 44.4 percent total sugar calculated as invert sugar, was of a granular texture, free flowing with greatly reduced tendency to cake or lump on storage in air of normal humidity and was suitable for blending with other feed ingredients.

EXAMPLE XXIII

To a continuous paddle type mixer were added per minute 46 pounds of corn germ meal (approx. 90 percent D.S.) and 10 gallons of a sweetening agent at 115° F., composed of 50 percent dry substance corn sugar molasses and 50 percent dry substance cane sugar molasses and containing approximately 71 percent total sugar by weight on the dry basis. Steam at 15 p.s.i.g. was sparged into the mixer continuously to effect the complete absorption of the sweetener by the feed carrier, as the blending of the carrier and sweetener continued. Approximately 10 minutes were required for the passage of the wet product through the mixer and an additional 2 minutes elapsed in conveying the wet product to the drier. The wet product discharging from the mixer contained approximately 32 percent moisture and was at a temperature of approximately 190° F. Drying of the wet product was accomplished in a Heil Continuous Dryer at 260° F. The dried product contained 1.5 to 2.5 percent moisture and 41.5 percent total sugar by weight. The yeild of dried product was approximately 105 pounds per minute.

As shown in the examples above, steaming animal feed carriers according to the present invention results in substantially complete absorption of sweetening agents into the carriers. This sweetened feed, after drying, is of granular texture, free flowing with greatly reduced tendency to cake or lump on storage. On the other hand, dried sweetened feeds which were produced by simply mixing the carrier and sweetening agent and drying, resulted in an unsatisfactory product which was caked and lumpy and exhibited unabsorbed sweetening agent on the surfaces of the carrier particles.

What is claimed is:

1. A method of producing a dried, sweetened, free-flowing animal feed comprising contacting with steam an animal feed carrier selected from the group consisting of corn germ meal, hay, peanut stem meal, corn cobs, beet pulp, cane bagasse, wheat bran, tea residue and mixtures thereof, forming a mixture of the animal feed carrier and molasses at a temperature of from about 150° to about 225° F. thereby effecting absorption into the carrier of substantial quantities of the sweetening agent and drying the steamed feed.

2. A method of producing a dried, sweetened, free-flowing animal feed as defined in claim 1, which comprises forming a hot, wet mixture of a molasses and carrier, steaming the mixture to effect absorption into said carrier of substantial quantities of the molasses and drying the steamed feed.

3. A method of producing a dried, sweetened, free-flowing animal feed as defined in claim 2, wherein the molasses is selected from the group consisting of cane and corn sugar molasses and mixtures thereof.

4. A method of producing a dried, sweetened, free-flowing animal feed as defined in claim 3, wherein sufficient molasses is absorbed into the carrier to achieve a level of sugar therein of between about 40 and about 50 percent by weight based on the dried feed.

5. A dried, sweetened, free-flowing animal feed produced according to the method of claim 4 which is characterized by having particles thereof substantially completely permeated by the molasses and showing a honey-combed interior.

6. A method of producing a dried, sweetened, free-flowing animal feed as defined in claim 3, wherein the molasses prior to being mixed with the animal feed carrier is heated to a temperature of from about 100° to about 225° F.

7. A method of producing a dried, sweetened, free-flowing animal feed as defined in claim 6, wherein the steamed, hot mixture is aerated prior to drying.

8. A method of producing a dried, sweetened, free-flowing animal feed as defined in claim 6, wherein the molasses contains above about 60 percent total sugars on a dry weight basis.

9. A method of producing a dried, sweetened, free-flowing animal feed as defined in claim 8, wherein the animal feed carrier is corn germ meal and the corn germ meal and molasses are mixed at a temperature of from about 220° to about 225° F.

References Cited

UNITED STATES PATENTS

| | | | |
|---|---|---|---|
| 2,904,435 | 9/1959 | Kruse | 99—2 |
| 776,595 | 12/1904 | Joehnk | 99—6 |
| 2,707,151 | 4/1955 | Martin | 99—6 |
| 2,912,331 | 11/1959 | Turner et al. | 99—6 |

A. LOUIS MONACELL, Primary Examiner

R. M. ELLIOTT, Assistant Examiner

U.S. Cl. X.R.

99—2

UNITED STATES PATENT OFFICE
CERTIFICATE OF CORRECTION

Patent No. 3,745,017          Dated July 10, 1973

Inventor(s) Keith E. Queal

It is certified that error appears in the above-identified patent and that said Letters Patent are hereby corrected as shown below:

Column 1; Following the name and address of the patentee, the heading should read--Assignor to Standard Brands Incorporated, New York, N. Y.--.

Column 2, line 15; "whcih" should read--which--.

Column 4, lines 18; "steam", first occurance, should read--steamed--.

Column 4, line 26; "drying" should read--dry--.

Column 8, line 49; "yeild" should read--yield--.

Signed and sealed this 5th day of February 1974.

(SEAL)
Attest:

EDWARD M. FLETCHER, JR.
Attesting Officer

RENE D. TEGTMEYER
Acting Commissioner of Patents